United States Patent
Noda

(10) Patent No.: US 10,142,062 B2
(45) Date of Patent: Nov. 27, 2018

(54) TRANSMISSION DEVICE, RECEPTION DEVICE, AND COMMUNICATION SYSTEM AND REMOTE OPERATING DEVICE EACH INCLUDING TRANSMISSION DEVICE AND RECEPTION DEVICE

(71) Applicant: Panasonic Intellectual Property Management Co., Ltd., Osaka (JP)

(72) Inventor: Masaaki Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/124,398

(22) PCT Filed: Feb. 18, 2016

(86) PCT No.: PCT/JP2016/000859
§ 371 (c)(1),
(2) Date: Sep. 8, 2016

(87) PCT Pub. No.: WO2016/157689
PCT Pub. Date: Oct. 6, 2016

(65) Prior Publication Data
US 2017/0134122 A1    May 11, 2017

(30) Foreign Application Priority Data
Mar. 30, 2015  (JP) .................................. 2015-068175

(51) Int. Cl.
*H04B 7/06* (2006.01)
*H04L 1/02* (2006.01)
(Continued)

(52) U.S. Cl.
CPC ................ *H04L 1/08* (2013.01); *G08C 17/02* (2013.01); *G08C 19/14* (2013.01); *G08C 25/00* (2013.01);
(Continued)

(58) Field of Classification Search
CPC ...... G07C 9/00182; G07C 2009/00206; G07C 2009/00769; G07C 2009/00984;
(Continued)

(56) References Cited

U.S. PATENT DOCUMENTS 5,369,639 A    11/1994 Kamerman et al.
2009/0109017 A1* 4/2009 Huang ................. G08B 25/008
340/506
(Continued)

FOREIGN PATENT DOCUMENTS

| DE | 10359898 A1 | 7/2005 |
|---|---|---|
| JP | 56-083197 | 7/1981 |

(Continued)

OTHER PUBLICATIONS

International Search Report of PCT application No. PCT/JP2016/000859 dated May 10, 2016.
(Continued)

*Primary Examiner* — Golam Sorowar
(74) *Attorney, Agent, or Firm* — McDermott Will & Emery LLP

(57) ABSTRACT

A transmission device includes a first control unit and a signal transmission unit. The first control unit outputs transmission data. The signal transmission unit receives transmission data, converts the data to a first frequency signal and a second frequency signal, and transmits the signals. The reception device includes a signal reception unit and a second control unit. The signal reception unit outputs a first reception signal based on the first frequency signal, and
(Continued)

outputs a second reception signal based on the second frequency signal. The second control unit outputs a first control signal in a case where at least one the first reception signal or the second reception signal includes the transmission data. A communication system includes a transmission device and a reception device. A remote operating device includes an input unit, a transmission device, a reception device, and a controlled unit.

30 Claims, 6 Drawing Sheets

(51) Int. Cl.
| | |
|---|---|
| H04L 1/04 | (2006.01) |
| H04L 1/08 | (2006.01) |
| H04B 15/00 | (2006.01) |
| G08C 17/02 | (2006.01) |
| G08C 19/14 | (2006.01) |
| G08C 25/00 | (2006.01) |
| H04L 1/18 | (2006.01) |

(52) U.S. Cl.
CPC ............. *H04B 15/00* (2013.01); *H04L 1/02* (2013.01); *H04L 1/04* (2013.01); *H04L 1/188* (2013.01); *H04L 1/189* (2013.01); *H04L 1/1883* (2013.01); *H04B 7/06* (2013.01)

(58) Field of Classification Search
CPC ........ G07C 5/00; G07C 5/08; G07C 9/00896; H04M 1/0254; H04M 1/72533; H04W 4/008; H04W 88/00
See application file for complete search history.

(56) References Cited

U.S. PATENT DOCUMENTS

| | | |
|---|---|---|
| 2010/0328135 A1 | 12/2010 | Hilgers |
| 2013/0114470 A1 | 5/2013 | Lee et al. |
| 2014/0159865 A1* | 6/2014 | Eto ................... G07C 9/00126 340/5.61 |
| 2014/0354404 A1* | 12/2014 | Lin ................... G07C 9/00182 340/5.64 |
| 2015/0077226 A1* | 3/2015 | Lin ................... H04W 52/0229 340/5.72 |
| 2015/0087241 A1* | 3/2015 | Van Wiemeersch ..... H04K 3/22 455/67.13 |
| 2015/0178236 A1* | 6/2015 | Sharma ................. G06F 13/385 710/38 |
| 2015/0349926 A1* | 12/2015 | Pollack ................... H04L 1/188 714/749 |

FOREIGN PATENT DOCUMENTS

| | | |
|---|---|---|
| JP | 2-281897 | 11/1990 |
| JP | 6-029978 | 2/1994 |
| JP | 9-065457 | 3/1997 |
| JP | 2003-051962 | 2/2003 |
| JP | 2011-514093 | 4/2011 |
| WO | 1996/021978 A1 | 7/1996 |

OTHER PUBLICATIONS

The Extended European Search Report dated Jun. 7, 2018 for the related European Patent Application No. 16745400.8.
Communication pursuant to Rule 164(1) EPC dated Mar. 19, 2018 for the related European Patent Application No. 16745400.8.

* cited by examiner

TRANSMISSION DEVICE, RECEPTION DEVICE, AND COMMUNICATION SYSTEM AND REMOTE OPERATING DEVICE EACH INCLUDING TRANSMISSION DEVICE AND RECEPTION DEVICE

This application is a U.S. national stage application of the PCT international application No. PCT/JP2016/000859.

TECHNICAL FIELD

The present disclosure relates to a transmission device that transmits a signal wirelessly, a reception device, and a communication system and a remote operating device each including the transmission device and the reception device.

BACKGROUND ART

A conventional communication system includes a first communication device and a second communication device. The first communication device includes a first control unit, a transmission unit, and an error signal reception unit.

The second communication device includes a second control unit, a reception unit, and a response unit.

The first control unit outputs transmission data to the transmission unit. The transmission unit converts the transmission data output from the first control unit to a first frequency and transmits the converted data to the second communication device (first transmission). The reception unit of the second communication device receives data from the transmission unit. If it is determined that the signal received by the reception unit is not correct transmission data, the second control unit outputs an error signal to the response unit. The response unit converts the error signal from the second control unit to the first frequency and transmits the converted signal to the error signal reception unit of the first communication device. An output of the error signal reception unit is supplied to the first control unit. If the first control unit detects the error signal, the first control unit outputs transmission data again to the transmission unit. Then, the transmission unit performs second transmission. The first control unit outputs the transmission data again after a lapse of a random backoff time after outputting an error signal.

Patent Literature 1, for example, is known as prior art information related to this application.

CITATION LIST

Patent Literature

PTL 1: Japanese Unexamined Patent Application Publication No. 6-29978

SUMMARY

A transmission device (first communication device) according to the present disclosure includes a first control unit and a signal transmission unit.

The first control unit outputs transmission data including an identification signal.

The signal transmission unit receives the transmission data, converts the data to a first frequency signal and a second frequency signal having a frequency different from that of the first frequency signal, and transmits the first and second frequency signals.

A reception device (second communication device) according to the present disclosure includes a signal reception unit and a second control unit.

The signal reception unit receives the first frequency signal and the second frequency signal, outputs a first reception signal based on the first frequency signal, and outputs a second reception signal based on the second frequency signal.

The second control unit receives the first reception signal and the second reception signal, outputs a first control signal in a case where at least one the first reception signal or the second reception signal includes the transmission data.

A communication system according to the present disclosure includes a transmission device (first communication device) and a reception device (second communication device).

A remote operating device according to the present disclosure includes an input unit, a transmission device (first communication device), a reception device (second communication device), and a controlled unit.

The transmission device (first communication device) includes a first control unit and a signal transmission unit.

The first control unit outputs transmission data including an identification signal based on an instruction signal input from the input unit.

The signal transmission unit receives the transmission data, converts the data to a first frequency signal and a second frequency signal having a frequency different from that of the first frequency signal, and transmits the first and second frequency signals.

The reception device (second communication device) includes a signal reception unit and a second control unit.

The signal reception unit receives the first frequency signal and the second frequency signal, outputs a first reception signal based on the first frequency signal, and outputs a second reception signal based on the second frequency signal.

The second control unit receives the first reception signal and the second reception signal, and outputs a first control signal to the controlled unit in a case where at least one the first reception signal or the second reception signal includes the transmission data.

DESCRIPTION OF EMBODIMENT

Figure 1:
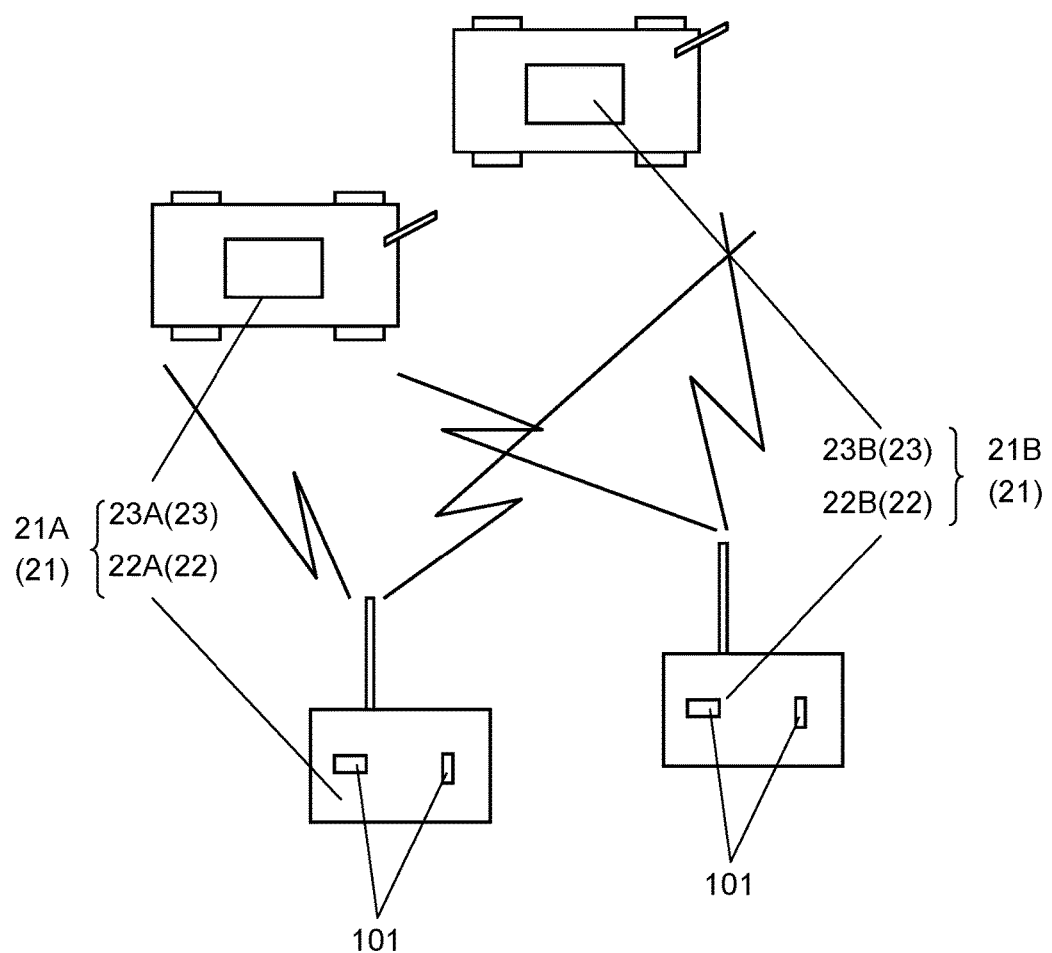
FIG. 1 is a conceptual view of a remote operating device according to an exemplary embodiment.

In a conventional reception unit, if transmission data that is transmitted at the first time is not correctly received, the transmission data is transmitted again after a lapse of a backoff time. The backoff time, however, is set at random in order to be shifted from the timing of transmission from another communication system. Thus, a receiver needs to continue a reception state until reception of transmission data transmitted at the second time is completed after a lapse of the longest backoff time. Accordingly, a period during which the receiver is activated increases. Consequently, power consumption of the receiver increases.

Prior to description of a remote operating device according to an exemplary embodiment, a remote operating device will be described. The remote operating device includes an operating device with which an operator performs an operation and an operated device controlled in accordance with the operation of the operating device with wireless communication. The remote operating device is, for example, a model that is wirelessly controlled. The wirelessly controlled model may be an automobile, for example, or a yacht or other objects. In such cases, the operating device and the operated device are separated from each other. The remote operating device is not limited to such wirelessly controlled models, and may be a bicycle, for example. In this case, both the operating device and the operated device are mounted on a frame of the bicycle, for example.

In some cases, a plurality of remote operating devices operate at the same time. For example, in a contest of radio-controlled cars, multiple radio-controlled cars run at the same time. At this time, many of the radio-controlled cars perform similar wireless communication. Thus, a radio-controlled car operated by a person might be interfered with wireless communication of a radio-controlled car operated by another person. In the case of such interference, the radio-controlled car might be inoperative or an operation of the radio-controlled car might be delayed. In view of this, a remote operating device needs to suppress occurrence of interference with another remote operating device or communication of another wireless equipment.

Such an operated device is movable. Thus, at least the operated device has difficulty in continuously receiving electric power from a general commercial power supply. In a case where the remote operating device is a bicycle, for example, the operating device also has difficulty in receiving electric power from a commercial power supply. Thus, the remote operating device needs to operate with electric power from a power supply except a commercial power supply, such as a battery, a storage battery, or a self-contained power generator. Note that each of the operating device and the operated device does not need to always operate with electric power from a power supply except a commercial power supply, and only needs to have a configuration that enables operation with a power supply except a commercial power supply. Each of the operating device and the operated device is not limited to a movable configuration, and may be used while being installed at a predetermined place. As described above, the remote operating device operates with limited electric power. In particular, the amount of electric power generated by a self-contained power generator is small. Thus, electric power consumed by the remote operating device is preferably small. That is, a time necessary for communication is preferably short. A standby time in a case where transmission data transmitted at the first time is not correctly received is preferably short. In addition, in a case where a plurality of remote operating devices operate at the same time, these remote operating devices preferably do not interfere with each other.

Exemplary Embodiment

Figure 2:
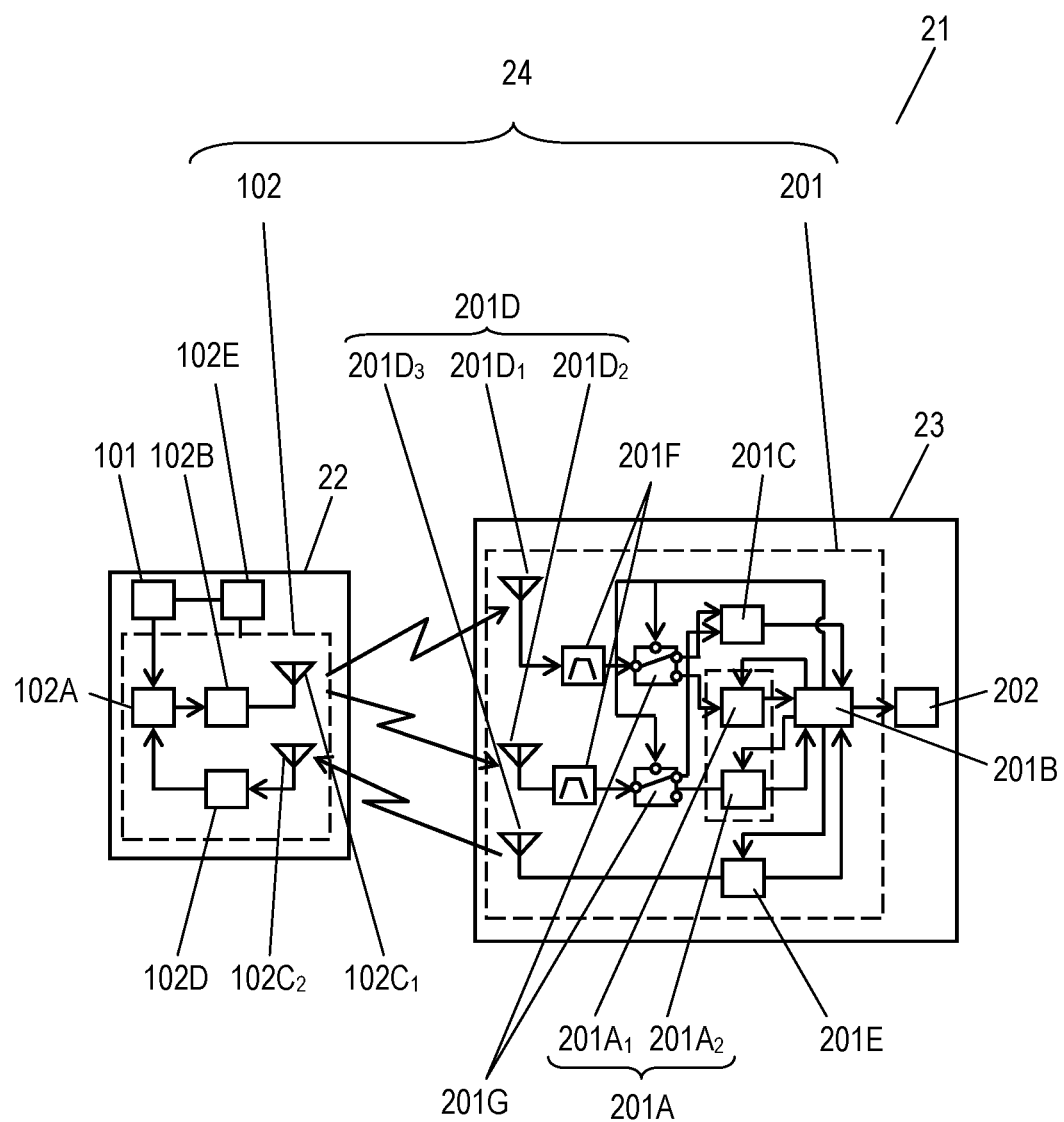
FIG. 2 is a block diagram of the remote operating device according to the exemplary embodiment.
Figure 3:
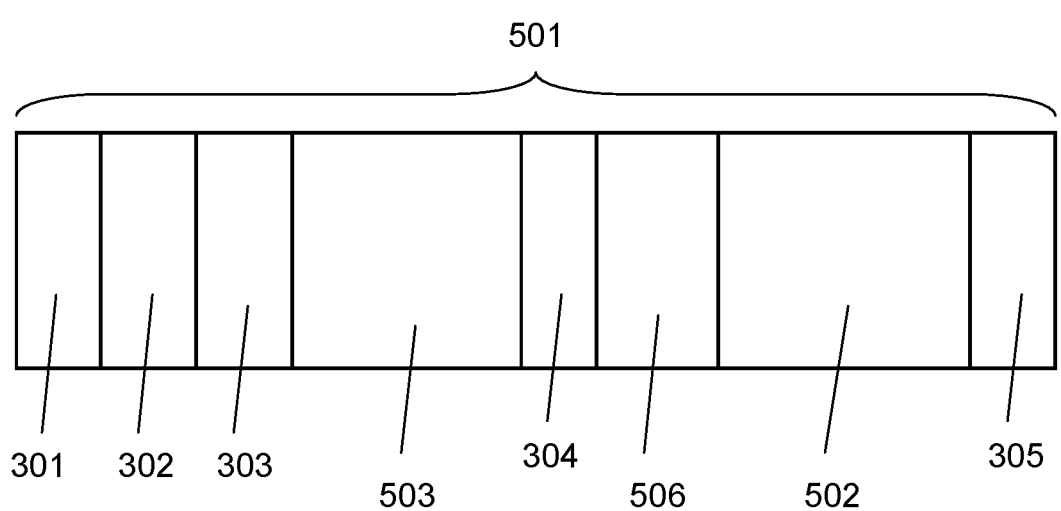
FIG. 3 illustrates the content of transmission data in the exemplary embodiment.

A transmission device (first communication device 102), a reception device (second communication device 201), communication system 24, and remote operating device 21 will be described hereinafter with reference to the drawings. FIG. 1 is a conceptual view of remote operating device 21. FIG. 2 is a block diagram of remote operating device 21. FIG. 3 illustrates the content of transmission data 501. Transmission data 501 includes instruction signal 502 and identification signal 503. Transmission data 501 may further include preamble 301, sync signal 302, control signal 303, retransmission number signal 304, error detection signal 305, and operation number signal 506.

In the present embodiment, as illustrated in FIG. 1, remote operating device 21A and remote operating device 21B will be described as examples. Here, remote operating device 21A and remote operating device 21B are both radio-controlled cars. Remote control device 21A includes operating device 22A and operated device 23A. Remote control device 21B includes operating device 22B and operated device 23B. Remote control device 21A and remote operating device 21B have different identification numbers, but have the same configuration. Thus, description will be given on remote operating device 21 as a representative of remote operating device 21A and remote operating device 21B.

Remote control device 21 includes operating device 22 and operated device 23. Operating device 22 includes input unit 101 and first communication device 102 (transmission device). Operated device 23 includes second communication device 201 (reception device) and controlled unit 202. Communication system 24 includes a first communication device 102 (transmission device) and a second communication device 201 (reception device). An output of second communication device 201 is supplied to controlled unit 202. Controlled unit 202 is, for example, a motor or a gear. Remote control device 21 includes input unit 101, first communication device 102, second communication device 201, and controlled unit 202. In the foregoing configuration, an operator (not shown) operates input unit 101. In response to the operation of the operator, input unit 101 outputs an instruction signal 502 illustrated in FIG. 3. In a case where operating device 22 operates with a self-contained power generator 102E, power generator 102E generates charge with an operation of input unit 101. Power generator 102E can generate power with, for example, an electromagnet or a piezoelectric element.

Remote control device 21 stores a unique identification number. That is, remote operating device 21A and remote operating device 21B illustrated in FIG. 1 have different identification numbers. Identification signal 503 illustrated in FIG. 3 corresponds to an identification number. Based on instruction signal 502 input from input unit 101, first control unit 102A outputs transmission data 501 including identification signal 503 and instruction signal 502.

Transmission data 501 includes identification signal 503 corresponding to an identification number. The identification number is, for example, a number unique to, for example, a communication system, an operating device, or an operated device. The identification number may be a permanently fixed number. The identification number may be, for example, a serial number provided in a fabrication process of, for example, a communication system, an operating device, or an operated device. Alternatively, the identification number may be, for example, a number assigned to, for example, a communication system, an operating device, or an operated device in a contest or other situations.

Transmission data 501 is transmitted from first communication device 102 to second communication device 201. Based on identification signal 503, operated device 23 determines whether instruction signal 502 is a signal received from operating device 22 with which operated device 23 should communicate. Second communication device 201 that received instruction signal 502 outputs a first control signal based on instruction signal 502 to controlled unit 202. Through these operations, the operator can operate operated device 23 with wireless communication.

First communication device 102 will now be specifically described.

First communication device 102 includes first control unit 102A and signal transmission unit 102B. An output of input unit 101 is supplied to first control unit 102A. First control unit 102A outputs transmission data 501 illustrated in FIG. 3 to signal transmission unit 102B. That is, transmission data 501 serves as an input signal of signal transmission unit 102B. Signal transmission unit 102B converts the input signal to first frequency signal $Sf_1$ with first frequency $f_1$ and second frequency signal $Sf_2$ with second frequency $f_2$ different from that of first frequency signal $Sf_1$. Here, signal transmission unit 102B may start transmission of second frequency signal $Sf_2$ after starting transmission of first frequency signal $Sf_1$. Alternatively, signal transmission unit 102B may transmit second frequency signal $Sf_2$ after completing transmission of first frequency signal $S_1$. That is, signal transmission unit 102B transmits transmission data 501 using two frequencies. Both first frequency signal $Sf_1$ and second frequency signal $Sf_2$ are high frequency signals. First frequency $f_1$ and second frequency $f_2$ may be in, for example, a 2.4 GHz band.

On the other hand, second communication device 201 includes signal reception unit 201A and second control unit 201B. Signal reception unit 201A receives first frequency signal $Sf_1$ and outputs first reception signal $S_1$. Signal reception unit 201A receives second frequency signal $Sf_2$ and outputs second reception signal $S_2$. An output of signal reception unit 201A is supplied to second control unit 201B. That is, first reception signal $S_1$ and second reception signal $S_2$ are supplied to second control unit 201B. If it is determined that at least one of first reception signal $S_1$ or second reception signal $S_2$ includes identification signal 503, second control unit 201B outputs first control signal $Sc_1$ corresponding to instruction signal 502 to controlled unit 202.

Communication system 24 and remote operating device 21 according to the present embodiment will now be more specifically described. As illustrated in FIG. 2, signal transmission unit 102B may include antenna $102C_1$. First frequency signal $Sf_1$ and second frequency signal $Sf_2$ output from signal transmission unit 102B are transmitted through antenna $102C_1$. Antenna $102C_1$ can preferably transmit first frequency signal $Sf_1$ and second frequency signal $Sf_2$. Since one antenna $102C_1$ transmits first frequency signal $Sf_1$ and second frequency signal $Sf_2$, the size of first communication device 102 can be reduced. Antenna $102C_1$ is not limited to the configuration that transmits first frequency signal $Sf_1$ and second frequency signal $Sf_2$, and may be configured as an antenna (not shown) for transmitting first frequency signal $Sf_1$ and an antenna (not shown) for transmitting second frequency signal $Sf_2$ separately.

Signal transmission unit 102B converts transmission data 501 to two frequencies of first frequency $f_1$ and second frequency $f_2$, and transmits the converted signals. However, the present disclosure is not limited to this configuration, and the data may be converted to three or more frequencies for transmission. In such a configuration, signal reception unit 201A can also receive the entire frequency band of a signal transmitted from signal transmission unit 102B.

As illustrated in FIG. 2, second communication device 201 may include antenna 201D that receives first frequency signal $Sf_1$ and second frequency signal $Sf_2$. Antenna 201D receives first frequency signal $Sf_1$ and second frequency signal $Sf_2$, and outputs first frequency signal $Sf_1$ and second frequency signal $Sf_2$ to signal reception unit 201A.

Signal reception unit 201A may include first receiver $201A_1$ and second receiver $201A_2$. First receiver $201A_1$ receives first frequency signal $Sf_1$ and outputs first reception signal $S_1$. Second receiver $201A_2$ receives second frequency signal $Sf_2$ and outputs second reception signal $S_2$. In this case, antenna 201D may include antenna $201D_1$ and antenna $201D_2$. For example, antenna $201D_1$ may receive first frequency signal $Sf_1$ with antenna $201D_2$ receiving second frequency signal $Sf_2$. A signal received by antenna $201D_1$ may be supplied to first receiver $201A_1$ with a signal received by antenna $201D_2$ being supplied to second receiver $201A_2$.

Signal transmission unit 102B preferably includes a first transmitter (not shown) for transmitting first frequency signal $Sf_1$ and a second transmitter (not shown) for transmitting second frequency signal $Sf_2$. With this configuration, in signal transmission unit 102B, a period from transmission of first frequency signal $Sf_1$ to transmission of second frequency signal $Sf_2$ can be shortened. That is, signal reception unit 201A can shorten the time necessary for receiving first frequency signal $Sf_1$ and second frequency signal $Sf_2$. Specifically, signal transmission unit 102B can transmit second frequency signal $Sf_2$ before completing transmission of first frequency signal $Sf_1$. Signal reception unit 201A can receive second frequency signal $Sf_2$ before completing reception of first frequency signal $Sf_1$. Thus, the period in which signal reception unit 201A is activated can be shortened so that power consumption of second communication device 201 can be reduced.

Figure 4:
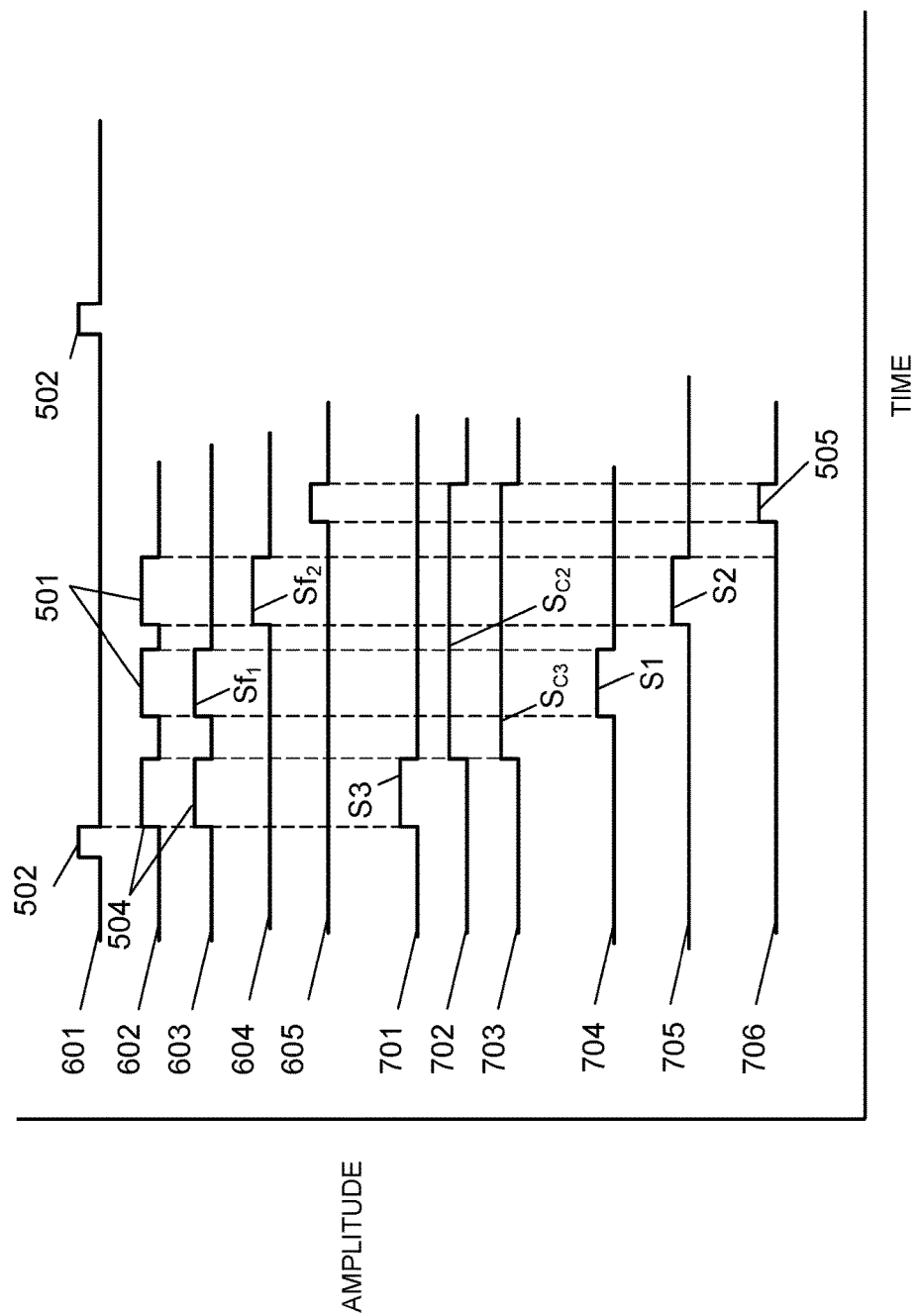
FIG. 4 is a timing chart concerning an operation of a communication system according to the exemplary embodiment.

Second communication device 201 preferably further includes activation signal detector 201C. Start signal detector 201C preferably can receive both first frequency signal $Sf_1$ and second frequency signal $Sf_2$. FIG. 4 is a timing chart concerning an operation of communication system 24.

In FIG. 4, signal 601 is a signal output from input unit 101. Signal 602 is a signal output from first control unit 102A. Signal 603 is a signal with first frequency $f_1$ output from signal transmission unit 102B. Signal 604 is a signal with second frequency $f_2$ output from signal transmission unit 102B. Signal 605 is a signal output from third receiver 102D. Signal 701 is a signal output from activation signal detector 201C. Signal 702 is second control signal $Sc_2$ output from second control unit 201B. Signal 703 is third control signal $Sc_3$ output from second control unit 201B. Signal 704 and signal 705 are signals output from signal reception unit 201A illustrated in FIG. 2. Signal 706 is a signal output from reply unit 201E.

First control unit 102A outputs activation signal 504 illustrated in FIG. 4 to signal transmission unit 102B. After outputting activation signal 504, first control unit 102A outputs transmission data 501 to signal transmission unit 102B. When detecting activation signal 504, activation signal detector 201C outputs third reception signal $S_3$ to second control unit 201B. When receiving third reception signal $S_3$, second control unit 201B supplies second control signal $Sc_2$ to signal reception unit 201A. In response to second control signal $Sc_2$, signal reception unit 201A is activated. That is, signal reception unit 201A can be activated based on activation signal 504. Since signal reception unit 201A is not activated until activation signal 504 is input, power electric power consumed by reception unit 201A can be reduced.

In a case where signal reception unit 201A includes first receiver 201A$_1$ and second receiver 201A$_2$, second control signal Sc$_2$ is supplied to both first receiver 201A$_1$ and second receiver 201A$_2$. First receiver 201A$_1$ and second receiver 201A$_2$ are activated in response to second control signal Sc$_2$. Since first receiver 201A$_1$ and second receiver 201A$_2$ are activated in response to activation signal 504, power consumption of first receiver 201A$_1$ and second receiver 201A$_2$ can be reduced.

Preferably, antenna 201D$_1$ receives both first frequency signal Sf$_1$ and second frequency signal Sf$_2$, and antenna 201D$_2$ receives second frequency signal Sf$_2$. With this configuration, antennas can be shared so that the size of second communication device 201 can be reduced. In addition, the number of components can be reduced so that productivity can be enhanced. As a result, communication system 24 can be obtained at low cost. In this case, a signal received by antenna 201D$_1$ is supplied to activation signal detector 201C and first receiver 201A$_1$. A signal received by antenna 201D$_2$ is supplied to second receiver 201A$_2$. The present disclosure, however, is not limited to the configuration described above, and antenna 201D$_2$ may receive both first frequency signal Sf$_1$ and second frequency signal Sf$_2$ with antenna 201D$_1$ receiving first frequency signal Sf$_1$. In this case, the signal received by antenna 201D$_2$ is supplied to activation signal detector 201C and second receiver 201A$_2$. On the other hand, the signal received by antenna 201D$_1$ is supplied to first receiver 201A$_1$. Alternatively, antenna 201D$_1$ may receive first frequency signal Sf$_1$ with antenna 201D$_2$ receiving second frequency signal Sf$_2$. In this case, first frequency signal Sf$_1$ received by antenna 201D$_1$ is supplied to activation signal detector 201C. On the other hand, second frequency signal Sf$_2$ received by antenna 201D$_2$ is supplied to second receiver 201A$_2$ and activation signal detector 201C. Alternatively, an antenna (not shown) dedicated to activation signal detector 201C may be provided.

Start signal detector 201C does not necessarily receive both first frequency signal Sf$_1$ and second frequency signal Sf$_2$, and may receive one of first frequency signal Sf$_1$ or second frequency signal Sf$_2$. For example, in a case where activation signal detector 201C can receive only first frequency signal Sf$_1$, signal reception unit 201A transmits activation signal 504 illustrated in FIG. 4 only at first frequency f$_1$. In this case, antenna 201D$_1$ receives first frequency signal Sf$_1$, and supplies received first frequency signal Sf$_1$ to activation signal detector 201C and first receiver 201A$_1$. On the other hand, antenna 201D$_2$ receives second frequency signal Sf$_2$, and supplies received second frequency signal Sf$_2$ to second receiver 201A$_2$. Alternatively, in a case where activation signal detector 201C receives only second frequency signal Sf$_2$, antenna 201D$_2$ receives second frequency signal Sf$_2$, and supplies received second frequency signal Sf$_2$ to activation signal detector 201C and second receiver 201A$_2$.

Second communication device 201 preferably includes reply unit 201E. In this case, first communication device 102 includes third receiver 102D. Reply unit 201E may include antenna 201D$_3$. Third receiver 102D may include antenna 102C$_2$. A signal output from reply unit 201E is supplied to antenna 201D$_3$. A signal received by antenna 102C$_2$ is supplied to third receiver 102D. In a case where it is determined that at least one of first reception signal S$_1$ or second reception signal S$_2$ includes identification signal 503, second control unit 201B outputs, to reply unit 201E, reply signal 505 indicating that instruction signal 502 is correctly received. Reply unit 201E transmits reply signal 505 to third receiver 102D. An output of third receiver 102D is supplied to first control unit 102A.

With this configuration, first control unit 102A can determine that transmission data 501 is correctly transmitted. In this case, retransmission of transmission data 501 is unnecessary. Thus, in the case of detecting reply signal 505, first control unit 102A stops retransmission of transmission data 501. With this configuration, occurrence of interference with another communication system can be suppressed. Alternatively, first control unit 102A may stop an operation of signal transmission unit 102B in the case of detecting reply signal 505. This configuration can reduce power consumption of first communication device 102. In addition, after transmitting reply signal 505, second control unit 201B can stop an operation of reply unit 201E. Thus, power consumption of second communication device 201 can be further reduced.

Reply unit 201E preferably converts reply signal 505 to third frequency signal Sf$_3$ with a third frequency different from first frequency f$_1$ and second frequency f$_2$. In this case, third receiver 102D receives third frequency signal Sf$_3$, and outputs fourth reception signal S$_4$ (reply receipt signal) to first control unit 102A. In a case where it is determined that fourth reception signal includes reply signal 505, first control unit 102A determines that transmission data 501 is correctly transmitted. With this configuration, occurrence of interference in signal reception unit 201A can be suppressed in transmitting reply signal 505 to first communication device 102. That is, since instruction signal 502 and reply signal 505 have different frequencies, it is possible to suppress interference of instruction signal 502 with reply signal 505. Since third frequency signal Sf$_3$ obtained by modifying reply signal 505 has a frequency different from those of first frequency signal Sf$_1$ and second frequency signal Sf$_2$ obtained by modifying an instruction signal, occurrence of interference among these signals can be suppressed.

Second communication device 201 preferably includes filter 201F. First frequency signal Sf$_1$ and second frequency signal Sf$_2$ pass through filter 201F. However, filter 201F attenuates third frequency signal Sf$_3$. As a result, it is possible to prevent third frequency signal Sf$_3$ from entering signal reception unit 201A and activation signal detector 201C. With this configuration, interference of instruction signal 502 with reply signal 505 can be suppressed. In addition, it is possible to reduce a problem that activation signal detector 201C malfunctions because of third frequency signal Sf$_3$ to cause reply signal 505 to be erroneously determined as activation signal 504. Filter 201F is provided between antenna 201D$_1$ and signal reception unit 201A or between antenna 201D$_2$ and signal reception unit 201A.

Second communication device 201 preferably includes switch 201G. A signal received by antenna 201D is supplied to switch 201G. A signal output from a first output terminal of switch 201G is supplied to activation signal detector 201C. A signal output from a second output terminal of switch 201G is supplied to signal reception unit 201A. Switch 201G is switched by supplying third control signal Sc$_3$ output from second control unit 201B to a connection switching terminal (not shown). In the case of detecting activation signal 504, second control unit 201B outputs third control signal Sc$_3$. Based on third control signal Sc$_3$, switch 201G switches connection from a first output terminal to a second output terminal. That is, in the case where second control unit 201B detects activation signal 504, one or both of first frequency signal Sf$_1$ and second frequency signal Sf$_2$ is supplied to signal reception unit 201A.

FIG. 4 illustrates a case where second control unit 201B illustrated in FIG. 2 can detect identification signal 503 at one communication operation. Input unit 101 outputs instruction signal 502 illustrated in FIG. 4 by an operation of an operator with input unit 101. First control unit 102A receives instruction signal 502 from input unit 101 and then outputs activation signal 504 to signal transmission unit 102B. Signal transmission unit 102B converts activation signal 504 to a first frequency signal or a second frequency signal and transmits the converted signal to second communication device 201. At this time, signal reception unit 201A does not operate, and activation signal detector 201C has been activated. Switch 201G allows one or both of first frequency signal $Sf_1$ and second frequency signal $Sf_2$ to be supplied to activation signal detector 201C. Start signal detector 201C receives the first frequency signal or the second frequency signal, and outputs third reception signal $S_3$ illustrated in FIG. 4 to second control unit 201B. Third reception signal $S_3$ is generated in accordance with first frequency signal $Sf_1$ or second frequency signal $Sf_2$. Based on third reception signal $S_3$, second control unit 201B outputs second control signal $Sc_2$ illustrated in FIG. 4 to signal reception unit 201A. As a result, signal reception unit 201A is activated in response to second control signal $Sc_2$.

At this time, second control unit 201B supplies third control signal $Sc_3$ illustrated in FIG. 4 to the connection switching terminal of switch 201G. With this configuration, switch 201G is switched to supply first frequency signal $Sf_1$ or second frequency signal $Sf_2$ to signal reception unit 201A. As a result, first frequency signal $Sf_1$ or second frequency signal $Sf_2$ is input to signal reception unit 201A.

Start signal detector 201C is preferably configured to output third reception signal $S_3$ in a case where input first frequency signal $Sf_1$ or second frequency signal $Sf_2$ is at a predetermined level (amplitude) or more. In this case, activation signal detector 201C is constituted by, for example, a demodulator. Thus, power consumption of activation signal detector 201C can be reduced.

With this configuration, second control unit 201B can activate signal reception unit 201A based on third reception signal $S_3$ illustrated in FIG. 4. For example, second control unit 201B may output second control signal $Sc_2$ in the case of detecting an input of third reception signal $S_3$. In this case, second control signal $Sc_2$ is output from second control unit 201B in a case where first frequency signal $Sf_1$ or second frequency signal $Sf_2$ input to activation signal detector 201C is at a predetermined level (amplitude) or more.

In FIG. 4, the level (amplitude) of a signal of transmission data 501 is preferably equal to or greater than the signal level (amplitude) of activation signal 504. In addition, the level (amplitude) of first frequency signal $Sf_1$ transmitted from signal transmission unit 102B is preferably equal to the level (amplitude) of second frequency signal $Sf_2$. With this configuration, activation signal detector 201C can also output third reception signal $S_3$ based on transmission data 501. Thus, even in a case where activation signal 504 cannot be received, second control unit 201B can activate signal reception unit 201A based on transmission data 501. Here, the term "activation signal 504 cannot be received" is supposed to be, for example, a case where an instruction signal from another equipment has the same frequency as that of activation signal 504 so that an interference occurs in the activation signal.

Second control unit 201B is not limited to the configuration in which second control signal $Sc_2$ is output based on the level (amplitude) of first frequency signal $Sf_1$ or second frequency signal $Sf_2$, and may have a configuration in which second control signal $Sc_2$ is output based on a signal length of first frequency signal $Sf_1$ or second frequency signal $Sf_2$. A signal length of third reception signal $S_3$ illustrated in FIG. 4 is determined based on a length from when input first frequency signal $Sf_1$ or second frequency signal $Sf_2$ reaches a specific level (amplitude) or more to when input first frequency signal $Sf_1$ or second frequency signal $Sf_2$ reaches a level less than the specific level (amplitude). In view of this, second control unit 201B may activate signal reception unit 201A in a case where the signal length of third reception signal $S_3$ illustrated in FIG. 4 is determined to be longer than a predetermined time.

In this case, a signal length of transmission data 501 is preferably equal to or greater than a signal length of activation signal 504. That is, the signal length of transmission data 501 is preferably equal to or greater than the signal length of third reception signal $S_3$. With this configuration, activation signal detector 201C can also activate signal reception unit 201A based on transmission data 501. Thus, even in a case where activation signal detector 201C fails to detect activation signal 504, signal reception unit 201A can be activated based on transmission data 501.

With the foregoing configuration, second control unit 201B outputs second control signal $Sc_2$ to signal reception unit 201A to activate signal reception unit 201A, in response to an input of third reception signal $S_3$. In addition, second control unit 201B outputs third control signal $Sc_3$ to switch 201G so that first frequency signal $Sf_1$ or second frequency signal $Sf_2$ is supplied to signal reception unit 201A. With this operation, signal reception unit 201A comes to be a state in which signal reception unit 201A can receive first frequency signal $Sf_1$ or second frequency signal $Sf_2$.

First control unit 102A outputs transmission data 501 to signal transmission unit 102B after a lapse of a predetermined time from an output of activation signal 504. Signal transmission unit 102B converts transmission data 501 to first frequency signal $Sf_1$ with a first frequency and second frequency signal $Sf_2$ with a second frequency, and transmits the converted signals to signal reception unit 201A. In a case where correct identification signal 503 is detected in first reception signal $S_1$ or second reception signal $S_2$, second control unit 201B outputs first control signal $Sc_1$ in accordance with instruction signal 502. In a case where transmission data 501 is correctly received in the foregoing manner, second communication device 201 transmits reply signal 505 from reply unit 201E to third receiver 102D. In addition, second control unit 201B changes or stops an output of second control signal $Sc_2$ to stop an operation of signal reception unit 201A.

Figure 5:
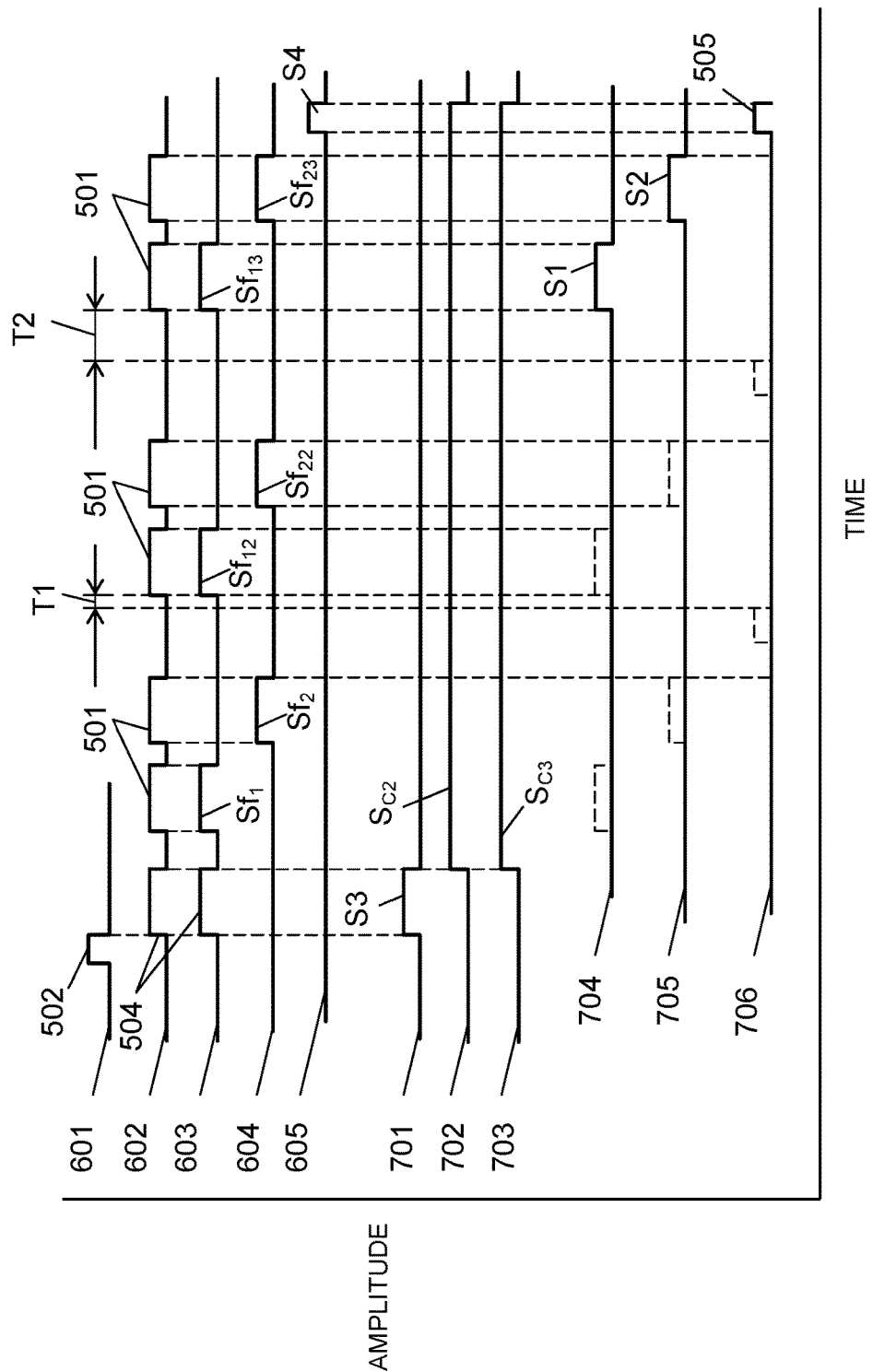
FIG. 5 is a timing chart concerning another operation of the communication system according to the exemplary embodiment.

A case where the first communication fails will now be described. FIG. 5 is a timing chart concerning another operation of communication system 24. In a case where no reply signal 505 is detected in a predetermined time (first time) after output of transmission data 501 illustrated in FIG. 5 to signal transmission unit 102B, first control unit 102A outputs transmission data 501 again to signal transmission unit 102B as first retransmission data. First control unit 102A repeats this operation until reply signal 505 is detected.

FIG. 5 illustrates a case where an interference with, for example, another communication system occurs twice and transmission is successful in re-retransmission at the third time. In the case where an interference occurs, there is a possibility that second control unit 201B fails to detect that each of first reception signal $S_1$ and second reception signal $S_2$ includes identification signal 503. If second control unit 201B fails to detect identification signal 503, first communication device 102 may convert transmission data 501 illustrated in FIG. 3 to first frequency signal $Sf_{12}$ and second frequency signal $Sf_{22}$ and transmits the converted signal as retransmission data, after a lapse of a specific time (standby time) since the predetermined time (first time) has elapsed. The standby time herein refers to first standby time T1 or second standby time T2 in FIG. 5. In FIG. 5, the length of first standby time T1 differs from the length of second standby time T2. Alternatively, the length of first standby time T1 may be equal to the length of second standby time T2. The start point of the standby time is, for example, a point of time when communication between first communication device 102 and second communication device 201 is completed. Note that the start point of the standby time is not limited to the time of completion of communication, and may be a point of time when first control unit 102A receives instruction signal 502 from input unit 101 or when first control unit 102A outputs transmission data 501 to signal transmission unit 102B. Alternatively, the start point may be a point of time when signal transmission unit 102B transmits first frequency signal $Sf_1$ or when signal transmission unit 102B transmits second frequency signal $Sf_2$.

With the foregoing configuration, as illustrated in FIG. 2, first communication device 102 and second communication device 201 communicate with each other using transmission data 501 illustrated in FIG. 5 at first frequency $f_1$ and second frequency $f_2$. For example, first communication device 102 can transmit transmission data 501 illustrated in FIG. 5 at first frequency $f_1$ and also transmit the data at second frequency $f_2$. In this manner, since first communication device 102 can transmit transmission data 501 at a plurality of frequencies, occurrence of an interference with another communication system can be suppressed. That is, in the present embodiment, it is sufficient to perform transmission without interference in at least one of a plurality of frequencies. Thus, unlike a conventional technique, the standby time does not need to be set at random so as to avoid interference. Since the standby time can be set at a predetermined time, not at random, the standby time can be shortened. Since the time during which signal reception unit 201A performs a reception operation can be shortened, power consumption of signal reception unit 201A can be reduced. Thus, operating device 22 can also operate with self-contained power generator 102E that generates only a small amount of electric power.

The predetermined time (standby time) may differ among remote operating devices 21. In other words, remote operating device 21A and remote operating device 21B illustrated in FIG. 1 preferably have different standby times. That is, each of remote operating devices 21 preferably has a unique time as a standby time. Remote control device 21 has a unique identification number, and identification signal 503 corresponds to the identification number. Thus, each remote operating device 21 preferably has a standby time based on the identification number. Since each of a plurality of remote operating devices 21 has a unique standby time, even if remote operating devices 21 operate at the same time in a first transmission, the probability that multiple remote operating devices 21 operate at the same time in a second transmission or a subsequent transmission decreases. That is, although interference occurs only in a case where signals are transmitted from a plurality of transmitters at the same timing and at the same frequency, a shift in timing at second and subsequent transmissions can suppress occurrence of interference.

First control unit 102A may have a maximum number of outputs of transmission data 501. For example, in a case where the maximum number is three, first control unit 102A repeatedly outputs transmission data 501 three times at most, as illustrated in FIG. 5. Then, after outputting transmission data 501 three times, first control unit 102A stops the output of transmission data 501. Thus, first control unit 102A ignores or does not accept instruction signal 502 output from input unit 101 in a predetermined time. Specifically, in a case where communication is successfully performed before the number of outputs reaches the maximum number, first control unit 102A does not accept instruction signal 502 until communication is successfully performed. In a case where communication is not successfully performed even when the number of outputs reaches the maximum number, first control unit 102A does not accept instruction signal 502 until transmission at the maximum number is completed. With this configuration, second control unit 201B can suppress erroneous determination of instruction signal 502.

Transmission data 501 preferably includes operation number signal 506 illustrated in FIG. 3, in accordance with the number of operations of an operator with input unit 101. With this configuration, second control unit 201B can detect the number of operations.

As illustrated in FIG. 5, in a case where no reply signal 505 is detected in a predetermined time after output of retransmission data 501 to signal transmission unit 102B, first control unit 102A may output first retransmission data again to signal transmission unit 102B after a lapse of first standby time T1. First control unit 102A preferably sets first standby time T1 depending on identification signal 503. With this configuration, first standby time T1 can be set at various times depending on the identification signal. Thus, an interval in which signal transmission unit 102B transmits transmission data 501 can be shifted from an interval in which another communication system transmits another transmission data. Accordingly, occurrence of interference with another communication device can be suppressed.

Furthermore, as illustrated in FIG. 5, in a case where no reply signal 505 is detected in a predetermined time after output of first retransmission data to signal transmission unit 102B, first control unit 102A may output transmission data 501 again to signal transmission unit 102B illustrated in FIG. 2 as second retransmission data after a lapse of second standby time T2. As a result, signal transmission unit 102B transmits first frequency signal $Sf_{13}$ with a first frequency and second frequency signal $Sf_{23}$. In this case, first control unit 102A preferably also sets second standby time T2 in accordance with identification signal 503. In first control unit 102A, in a case where first standby time T1 is long, second standby time T2 may be short. In contrast, in first control unit 102A, in a case where first standby time T1 is short, second standby time T2 may be long. That is, in first control unit 102A, first standby time T1 and second standby time T2 may be set based on identification signal 503 in such a manner that first standby time T1 and second standby time T2 differ from each other.

With this configuration, each of first standby time T1 and second standby time T2 can be obtained with correction of a standard time using an identification number or identification signal 503 in first control unit 102A. First standby time T1 may be obtained by, for example, multiplying the standard time by the identification number or identification signal 503. In this case, second standby time T2 can be obtained by, for example, dividing the standard time by the identification number or identification signal 503. Alternatively, first standby time T1 may be obtained by dividing the standard time by the identification number or identification signal 503. In this case, second standby time T2 can be obtained by, for example, multiplying the standard time by the identification number or identification signal 503. Alternatively, first standby time T1 may be obtained by, for example, adding the identification number or identification signal 503 to the standard time. In this case, second standby time T2 can be obtained by, for example, subtracting the identification number or identification signal 503 from the standard time. Alternatively, first standby time T1 may be obtained by subtracting the identification number or identification signal 503 from the standard time. In this case, second standby time T2 can be obtained by, for example, adding the identification number or identification signal 503 to the standard time. With the foregoing configuration, first standby time T1 and second standby time T2 can differ from each other so that occurrence of interference due to transmission from another communication system can be further suppressed.

Figure 6:
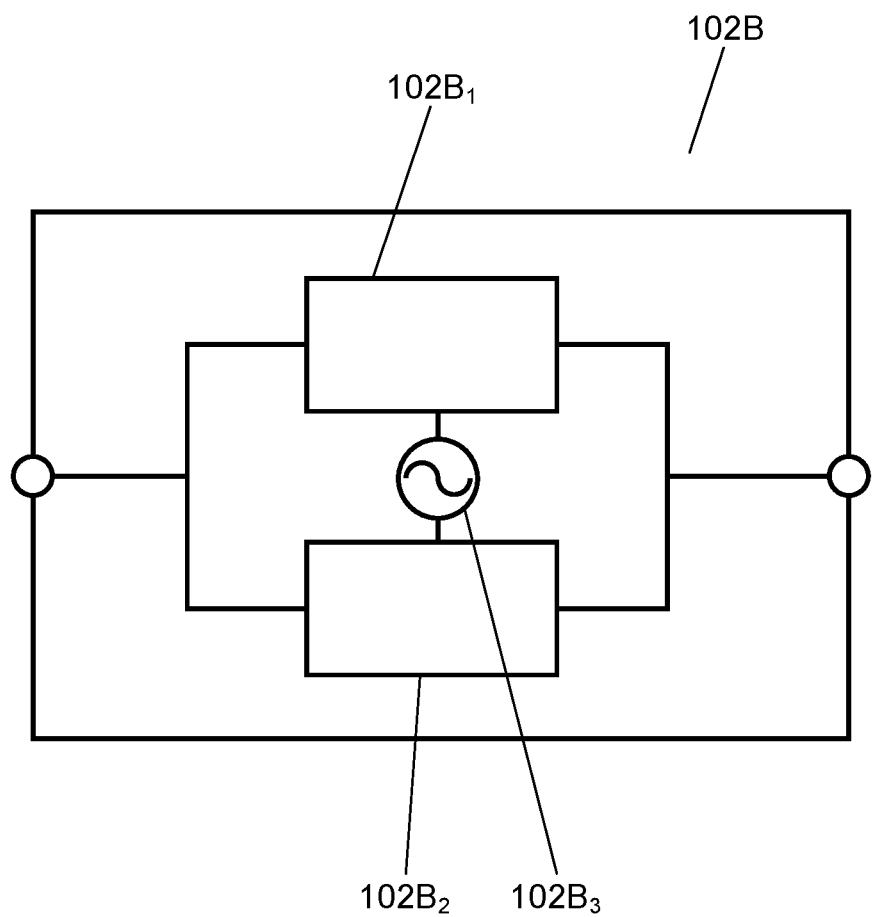
FIG. 6 is a block diagram of a signal transmission unit according to the exemplary embodiment.

FIG. 6 is an example of a block diagram of signal transmission unit 102B. Signal transmission unit 102B may include an instruction communication device 102B$_1$ for generating first frequency signal Sf$_1$ and an instruction communication device 102B$_2$ for generating second frequency signal Sf$_2$. A signal transmitter 102B$_3$ supplies a signal with a first frequency to instruction communication device 102B$_1$ and supplies a signal with a second frequency to instruction communication device 102B$_2$.

As described above, a first communication device according to the present disclosure can transmit transmission data in the first transmission at a first frequency and can transmit transmission data in second transmission at a second frequency. Thus, occurrence of interference with transmission of another communication system can be suppressed. In addition, a standby time can be set at a constant time, not at random. Thus, the standby time can be shortened. Since reception times of a first receiver and a second receiver can be shortened, power consumption of a second communication device can be reduced.

INDUSTRIAL APPLICABILITY

A communication system according to the present disclosure has advantages of suppressing occurrence of interference in communication and reducing power consumption, and is useful for, for example, equipment driven by a battery or a storage battery for operating an operation target wirelessly.

The invention claimed is:

1. A transmission device comprising:
a control unit that outputs transmission data; and
a signal transmission unit that receives the transmission data and converts the transmission data to a first frequency signal and a second frequency signal, the first frequency signal having a first frequency, the second frequency signal having a second frequency different from the first frequency, and
a receiver that receives a third frequency signal generated based on the transmission data, converts the third frequency signal to a reply receipt signal, and outputs the reply receipt signal to the control unit, the third frequency signal having a third frequency different from both of the first frequency and the second frequency, wherein:
the signal transmission unit is configured to:
first transmit a first signal having the first frequency;
transmit the first frequency signal after transmitting the first signal;
transmit a second signal having the first frequency after transmitting the first frequency signal; and
transmit the second frequency signal after transmitting the first frequency signal and before transmitting the second signal, and
a signal length of the first frequency signal is equal to a signal length of the first signal,
in a case where the reply receipt signal is not detected in a first time after output of the transmission data to the signal transmission unit, the first control unit outputs the transmission data again to the signal transmission unit as first retransmission data, and
in a case where the reply receipt signal is not detected in the first time, the control unit outputs the first retransmission data to the signal transmission unit after a lapse of a first standby time since the first time has elapsed.

2. The transmission device of claim 1, wherein the signal transmission unit starts transmission of the second frequency signal after starting transmission of the first frequency signal.

3. The transmission device of claim 2, wherein the signal transmission unit transmits the second frequency signal after completion of transmission of the first frequency signal.

4. The transmission device of claim 1, wherein the signal transmission unit includes:
a first transmitter that transmits the first frequency signal, and
a second transmitter that transmits the second frequency signal.

5. The transmission device of claim 1, wherein: the control unit includes an identification signal, and the control unit sets the first standby time based on the identification signal.

6. The transmission device of claim 1, wherein in a case where the reply receipt signal is not detected in a second time after output of the first retransmission data to the signal transmission unit, the control unit outputs the transmission data again to the signal transmission unit as second retransmission data after a lapse of a second standby time since the second time has elapsed.

7. The transmission device of claim 6, wherein the control unit sets the first standby time and the second standby time based on the identification signal in such a manner that the first standby time and the second standby time differ from each other.

8. The transmission device of claim 1, wherein a signal length of the second frequency signal is equal to or greater than the signal length of the first signal.

9. The transmission device of claim 8, wherein the signal length of the first frequency signal is equal to the signal length of the second frequency signal.

10. The transmission device of claim 1, wherein the second frequency signal is one of a plurality of second frequency signals each having the second frequency.

11. The transmission device of claim 1, further comprising:
an input unit that causes the transmission unit to output the transmission data; and
a power generator that generates electric power in response to an operation to the input unit and supplies the electric power to at least one of the control unit and the signal transmission unit.

12. The transmission device of claim 1, further comprising:
an input unit that outputs an instruction signal to the control unit, wherein the first signal is a signal transmitted by the signal transmission unit firstly after the instruction signal is output to the control unit.

13. A reception device that receives signals transmitted from the transmission device of claim 1, the reception device comprising:
a signal reception unit that:
receives the first signal, the second signal, the first frequency, and the second frequency signal which are transmitted from the transmission device,
outputs a first reception signal based on the first frequency signal, and
outputs a second reception signal based on the second frequency signal; and
another control unit that receives the first reception signal and the second reception signal, wherein
the signal reception unit is activated in response to one of the first frequency signal or the second frequency signal, and
the another control unit outputs a control signal in a case where at least one of the first reception signal or the second reception signal includes transmission data.

14. The reception device of claim 13, further comprising:
an activation signal detector that outputs a third reception signal to the another control unit in a case where one of the first frequency signal or the second frequency signal has a predetermined amplitude or more, wherein:
the another control unit activates the signal reception unit based on the third reception signal.

15. The reception device of claim 14, wherein the another control unit activates the signal reception unit in a case where a signal length of the third reception signal is a predetermined length or more.

16. The reception device of claim 15, wherein a signal length of the transmission data is equal to or greater than the signal length of the third reception signal.

17. The reception device of claim 13, wherein the signal reception unit includes a first receiver that receives the first frequency signal and outputs the first reception signal, and a second receiver that receives the second frequency signal and outputs the second reception signal.

18. The reception device of claim 13, further comprising:
a reply unit; and
a filter that allows the first frequency signal and the second frequency signal to pass therethrough, wherein:
in a case where it is determined that at least one of the first reception signal or the second reception signal includes an identification signal, the control unit outputs a reply signal to the reply unit, and
the reply unit converts the reply signal to a third frequency signal having a frequency different from the frequency of the first frequency signal and the frequency of the second frequency signal, and
the filter attenuates the third frequency signal.

19. The reception device of claim 13, wherein the signal reception unit is activated in response to any one of the first signal, the first frequency signal, and the second frequency signal.

20. A communication system comprising a transmission device and a reception device, wherein:
the transmission device includes:
a first control unit that outputs transmission data;
a signal transmission unit that receives the transmission data and converts the transmission data to a first frequency signal and a second frequency signal, the first frequency signal having a first frequency, the second frequency signal having a second frequency different from the first frequency; and
a receiver that receives a third frequency signal generated based on the transmission data, converts the third frequency signal to a reply receipt signal, and outputs the reply receipt signal to the first control unit, the third frequency signal having a third frequency different from both of the first frequency and the second frequency,
the signal transmission unit is configured to:
first transmit a first signal having the first frequency; and
transmit the first frequency signal after transmitting the first signal;
transmit a second signal having the first frequency after transmitting the first frequency signal; and
transmit the second frequency signal after transmitting the first frequency signal and before transmitting the second signal,
a signal length of the first frequency signal is equal to a signal length of the first signal,
in a case where the reply receipt signal is not detected in a first time after output of the transmission data to the signal transmission unit, the first control unit outputs the transmission data again to the signal transmission unit as first retransmission data, and
in a case where the reply receipt signal is not detected in the first time, the first control unit outputs the first retransmission data to the signal transmission unit after a lapse of a first standby time since the first time has elapsed,
the reception device includes:
a signal reception unit that receives the first signal, the second signal, the first frequency signal and the second frequency signal, outputs a first reception signal based on the first frequency signal, and outputs a second reception signal based on the second frequency signal, and
a second control unit that receives the first reception signal and the second reception signal,
wherein the second control unit outputs a first control signal in a case where at least one of the first reception signal or the second reception signal includes the transmission data.

21. The communication system of claim 20, wherein the signal reception unit is activated in response to one of the first frequency signal or the second frequency signal.

22. The communication system of claim 20, wherein the transmission device further includes:
an input unit that causes the transmission unit to output the transmission data; and
a power generator that generates electric power in response to an operation to the input unit and supplies the electric power to at least one of the control unit and the signal transmission unit.

23. The communication system of claim 20, wherein:
the transmission device further includes an input unit that outputs an instruction signal to the control unit, and
the first signal is a signal transmitted by the signal transmission unit firstly after the instruction signal is output to the first control unit.

24. The communication system of claim 20, wherein the signal transmission unit starts transmission of the second frequency signal after starting transmission of the first frequency signal.

25. The communication system of claim 20, wherein the signal reception unit is activated in response to any one of the first signal, the first frequency signal, and the second frequency signal.

26. A remote operating device comprising an input unit, a transmission device, a reception device and a controlled unit, wherein:

the transmission device includes:

a first control unit that outputs transmission data based on an instruction signal input from the input unit;

a signal transmission unit that receives the transmission data and converts the transmission data to a first frequency signal and a second frequency signal, the first frequency signal having a first frequency, the second frequency signal having a second frequency different from the first frequency; and a receiver that receives a third frequency signal generated based on the transmission data, converts the third frequency signal to a reply receipt signal, and outputs the reply receipt signal to the first control unit, the third frequency signal having a third frequency different from both of the first frequency and the second frequency, the signal transmission unit is configured to:

first transmit a first signal having the first frequency; and transmit the first frequency signal after transmitting the first signal;

transmit a second signal having the first frequency after transmitting the first frequency signal; and transmit the second frequency signal after transmitting the first frequency signal and before transmitting the second signal, a signal length of the first frequency signal is equal td a signal length of the first signal, in a case where the reply receipt signal is not detected in a first time after output of the transmission data to the signal transmission unit, the first control unit outputs the transmission data again to the signal transmission unit as first retransmission data, and in a case where the reply receipt signal is not detected in the first time, the first control unit outputs the first retransmission data to the signal transmission unit after a lapse of a first standby time since the first time has elapsed, the reception device includes:

a signal reception unit that receives the first frequency signal, the second signal, and the second frequency signal, outputs a first reception signal based on the first frequency signal, and outputs a second reception signal based on the second frequency signal; and a second control unit that receives the first reception signal and the second reception signal, the second control unit outputs the first control signal to the controlled unit in a case where at least one of the first reception signal or the second reception signal includes the transmission data.

27. The remote operating device of claim 26, wherein the first signal is a signal transmitted by the signal transmission unit firstly after the instruction signal is output to the first control unit.

28. The remote operating device of claim 26, wherein the signal reception unit is activated in response to one of the first frequency signal or the second frequency signal.

29. The remote operating device of claim 26, wherein the signal transmission unit starts transmission of the second frequency signal after starting transmission of the first frequency signal.

30. The remote operating device of claim 26, wherein the signal reception unit is activated in response to any one of the first signal, the first frequency signal, and the second frequency signal.

* * * * *